United States Patent [19]

Horton et al.

[11] 4,048,284

[45] Sept. 13, 1977

[54] METHOD AND SYSTEM FOR ION-EXCHANGING PARTICLES

[75] Inventors: Norman H. Horton; John L. Smith, both of Tallahassee, Fla.

[73] Assignee: Engelhard Minerals & Chemicals Corporation, Edison, N.J.

[21] Appl. No.: 665,095

[22] Filed: Mar. 8, 1976

[51] Int. Cl.² .................... F01C 19/02; B01J 8/00; B01J 29/06

[52] U.S. Cl. ........................ 423/112; 23/288 C; 423/332; 252/455 Z

[58] Field of Search ............... 252/455 Z; 423/332, 423/112; 23/288 C

[56] References Cited

U.S. PATENT DOCUMENTS 3,943,233  3/1976  Swanson et al. .................. 423/332

Primary Examiner—Carl F. Dees

Attorney, Agent, or Firm—Inez L. Moselle

[57] ABSTRACT

Disclosed are a method and system for ion-exchanging cations in zeolitic particles of a size useful in fluidized bed processes; for example, zeolitic microspheres of the type employed in fluidized bed hydrocarbon conversion processes. The zeolitic particles are ion-exchanged by a stagewise countercurrent contact with ion-exchange liquid as they are moved in series over a continuously moving horizontal vacuum belt filter in the form of a thin porous cake, then into an agitated tank where the cake is formed into a slurry, and to another continuously moving vacuum belt filter where the microspheres are again formed into a thin porous cake. The latter cake is contacted with incoming ion-exchange liquid that percolates through the cake, passes to the agitated tank and is charged to the cake on the first belt filter.

8 Claims, 1 Drawing Figure

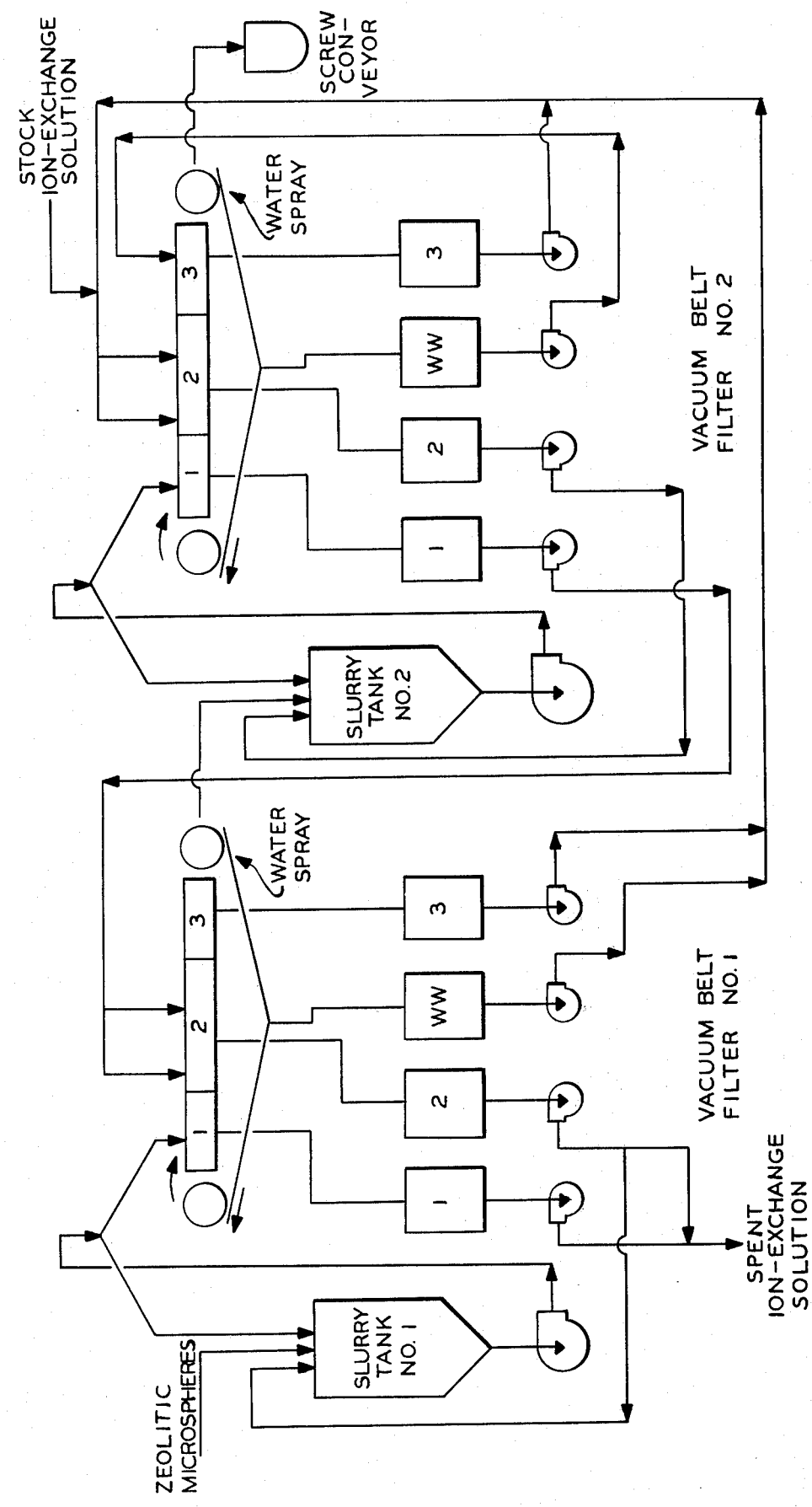

METHOD AND SYSTEM FOR ION-EXCHANGING PARTICLES

BACKGROUND OF THE INVENTION

1. Field of the Invention

This invention is concerned with the ion-exchange treatment of zeolitic particles, in particular to the ion-exchange treatment of zeolitic particles of a size and shape useful in fluidized bed processes, such as for example in fluid cracking catalyst (FCC) processes. In particular, the invention is concerned with an improved method and system for ion-exchanging cations such as sodium ions in zeolitic microspheres on a continuous commercial basis which features the use of moving sectionalized vacuum belt filters operated to include flooded percolation zones and in which ion-exchange treatment takes place with a countercurrently flowing ion-exchange liquid such as a solution of an ammonium salt.

2. Prior Art

Staged countercurrent ion-exchange is old in the art. When employed in conjunction with a series of thickeners effective exchange can be carried out. However, when applying conventional staged countercurrent ion-exchange to replace sodium ions with ammonium ions in zeolitic catalyst precursor microspheres (such as those produced by the process of U.S. 3,647,718 to W. L. Haden, Jr. and Frank J. Dzierzanowski), very dilute solutions of exchange salts are required. To reduce the sodium content of the zeolitic microspheres to a desired level, for example 1 percent or below, large volumes of exchange solution are needed. Adaptation of the conventional procedure to commercial practice would create large volumes of dilute spent nitrate solution, resulting in a costly concentration and/or disposal problem. Further, it would necessitate a large investment in equipment and plant site because of the large size of the equipment needed.

These obstacles were overcome by carrying out the ion-exchange treatment by the unique ion-exchange technique described in U.S. Pat. No. 3,943,233 of David B. Swanson and Walter L. Haden, Jr. This patent discloses a process for carrying out a plurality of liquid-solid contact steps on a single continuous vacuum belt filter wherein the rate constant of one of the steps, such as ion-exchange reaction, is an important factor. In an embodiment of the invention, exchangeable sodium cations in fluidizable zeolitic cracking catalyst precursor microspheres are exchanged with ammonium ions on a single sectionalized vacuum belt filter with a subdivided vacuum box underneath the upper surface of the belt. The microspheres are slurried, preferably in a spent ion-exchange solution, and the slurry is continuously fed at a substantially constant rate to the feed end of a continuous horizontally moving belt vacuum filter. While on the belt the microspheres pass serially through a cake-forming zone, then into an elongated ion-exchange zone and finally to a washing zone. The washed cake is discharged from the belt as it passes over a pulley system and the belt is sprayed with water on its return trip under the unit in order to remove adherent microspheres which would cause the belt to wear. A feature of the process of U.S. Pat. No. 3,943,233 is that the microspheres are formed in the first zone into a cake having a substantially dry crack-free surface but containing liquid in the voids between the microspheres. This condition is established by controlling the depth of vacuum in the first zone. The ion-exchange zone is operated under conditions such that the exchange solution percolates through such cake at a controlled rate of flow. The cake which leaves the percolation zone has a smooth substantially crack-free dry surface and contains liquid in the voids between the zeolitic microspheres. This condition is established by applying a relatively low vacuum depth under this zone of the filter. By applying a high vacuum under the third zone, wash liquid rapidly passes through the ion-exchange cake. In an illustrative example, the procedure was used to reduce the sodium in zeolitic catalyst microspheres (obtained by the process described in U.S. Pat. No. 3,647,718, supra) from an initial level of about 10 percent to about 1 percent by ion-exchange with hot 2N ammonium nitrate solution.

THE INVENTION

This invention results from the discovery that the base-exchange of exchangeable cations such as sodium ions in zeolitic catalyst microspheres on a continuous sectionalized vacuum belt filter can be carried out with unexpectedly high efficiency by operating with a plurality of such units in a series countercurrent mode hereinafter described.

One aspect of the invention resides in a novel system for ion-exchanging zeolitic catalyst precursor microspheres. Briefly stated, the system comprises a first agitated slurrying tank, a first sectionalized horizontally moving continuous vacuum belt filter, a second agitated slurrying vessel and a second sectionalized horizontally moving continuous vacuum belt filter, all arranged in series. Means are provided for passing feed microspheres on a continuous basis serially through the first slurrying tank, onto the moving belt of the first filter, to the second slurrying tank and then to the second filter from which the microspheres are discharged. The system also includes means for countercurrently contacting the microspheres during their serial travel with an incoming ion-exchange liquid charged to the second filter and means for washing the microspheres before they are discharged from the second filter. In a preferred embodiment of the system, the sole means for adding water to the system consists of means for separately spraying both of the belts with fresh water during their return trips and means for circulating the resulting wash waters as dilution water for incoming ion-exchange liquid to the second filter. The system of the invention is simple in construction and provides a means for carrying out highly efficient ion-exchange on a continuous basis with equipment that occupies a minimum of space and is highly flexible in mode of operation.

The other aspect of the invention involves a novel and highly efficient method for ion-exchanging zeolitic particles, typically small spherical or essentially spherical particles ranging in size from 20 to 150 microns (so-called "microspheres") with an ion-exchanging solution containing cations capable of replacing changeable cations in the zeolitic particles. The method comprises carrying out the ion-exchange reaction in stages by continuously passing the zeolitic particles, in series, over a continuously moving horizontal vacuum belt filter where the particles are in the form of a thin porous cake, into an agitated vessel to form a slurry and then over another continuously moving horizontal vacuum belt filter where the particles are again placed in the form of a thin porous cake, while continuously contacting the zeolitic particles during such passage countercurrently with ion-exchange liquid. The ion-exchange reaction is carried out in a manner such that the thin cakes on the belt filters are ion-exchanged under percolation conditions and incoming ion-exchange liquid is fed through the cake on the second belt filter. Ion-exchange liquid percolated through the cake on the second filter is used to form a fluid slurry with microspheres discharged from the first belt filter and this slurry is agitated sufficiently to maintain the particles in suspension. The liquid from this slurry is agitated sufficiently to maintain the particles in suspension. The liquid from this slurry is drained on the second belt filter and is percolated through the cake traveling on the first belt filter. Preferably the ion-exchanged cake is washed on the second filter but not on the first filter.

In a preferred embodiment of the method of the invention, ions such as sodium in microspherical zeolitic catalyst precursor particles are replaced by exchange with ions such as ammonium ions as a step in catalyst manufacture. Practice of this embodiment of the invention using an ammonium salt solution as the exchange liquid has resulted in a means for producing a zeolitic fluidized bed cracking catalyst (FCC) having an appreciably lower sodium content than could be achieved with a single belt operation, as described in U.S. Pat. No. 3,943,233, using an expenditure of ammonium ions which was not much greater, if any, than was used in the single sectionalized belt operation at the same throughput rate. Consequently a superior cracking catalyst was produced without substantial increase in processing costs and with no sacrifice in production rate.

In an especially preferred embodiment of the invention, all of the water introduced with the incoming ion-exchange liquid and all of the water used to wash an ion-exchanged cake is water previously used to spray the belts of the filters during their return passages. The amount of spray water used is controlled to adjust the concentration of the incoming ion-exchange solution to a desired concentration. This avoids dilution of ion-exchange liquid during its countercurrent flow, whereby spent by-product exchange liquid may be concentrated with an economically feasible heat input. Using ammonium nitrate to replace sodium ions in zeolitic particles, the concentration of the incoming exchange liquid is preferably selected to provide a spent ion-exchange liquid in which the molar ratio of sodium nitrate to ammonium nitrate does not exceed 0.5/1. Such solutions may be evaporated without salting out sodium nitrate.

The invention and its advantages will be more fully understood from the following detailed description, taken with the accompanying FIGURE which is a diagrammatic sketch of a system of the invention.

DESCRIPTION OF PREFERRED EMBODIMENTS

The system described in the accompanying drawing includes two vacuum belt filters (Filter No. 1 and No. 2) which are illustrated diagrammatically in side view. The general construction of both filters is illustrated in greater detail in the FIGURE included in the specification of U.S. Pat. No. 3,943,233. The FIGURE in U.S. Pat. No. 3,943,233 is incorporated herein by cross reference. Filters No. 1 and No. 2 both include a flat permeable belt, preferably perforated rubber, which carries on its upper surface a cloth filter medium which has openings smaller than the finest particles to be exchanged. In the system illustrated, the belt of each filter continuously moves horizontally from left to right at a constant predetermined rate of speed over a stationary vacuum box which is subdivided into three sections. These sections form three zones of filtrate separation on each belt, identified as Zones 1, 2 and 3 for Filters No. 1 and No. 2. In addition, each filter has a conventional spray means for washing the filter cloth and a receiver for belt wash water labeled "WW". Zone 1 of the No. 1 and No. 2 filters is a cake forming zone, the operation of which is detailed in U.S. Pat. No. 3,943,233. Similarly, Zone 2 of the No. 1 and No. 2 filters is a flooded zone in which exchange liquid passes under percolation conditions through the cake previously formed in Zone 1. Zone 3 of the No. 2 filter is a cake-washing zone as it is in the system illustrated in the FIGURE in U.S. Pat. No. 3,943,233 and the water used to wash the cake in Zone 3 of the No. 2 filter is the belt wash water (WW) used to wash the belt of the No. 2 filter. Zone 3 of the No. 1 filter is used for draining liquid from Zone 2 of the No. 1 filter. No wash water is added to Zone 3 of the No. 1 filter in the system illustrated. Belt wash water (WW) from the No. 1 filter is combinated with the Zone 3 water of the No. 2 filter and used as dilution water for the stock ion-exchange material which enters the system as a flooded (percolation) Zone 2 on the No. 2 filter. This water may be heated by a boiler (not shown) before it is used as dilution water or diluted ion-exchange solution may be heated before it is introduced to the No. 2 filter.

As best shown in the FIGURE of Ser. No. 444,173, the bottom of each zone of the vacuum boxes communicates through separate liquid receivers to filtrate pumps and a vacuum pump adapted to apply controlled vacuum to these receivers. Each receiver is equipped with its own pressure control valve to regulate separately the depth of vacuum in that receiver. Each control valve is associated with a pressure indicator control and a pneumatic signal transmission system. The FIGURE in U.S. Pat. No. 3,943,233 illustrates schematically the arrangement of the vacuum pump and liquid receivers and the indicator controls and signal transmission system. Also illustrated in the FIGURE in U.S. Pat. No. 3,943,233 is that vertical rubber dams are located above the belt between vacuum boxes and shows that within the compartment defined by the dam walls are weir boxes associated with sensing devices to control the rate of feed liquid.

Fresh ion-exchange liquid is charged to Zone 2 of the No. 2 filter from a divided feed supply tank where it is split into two portions, one of which is fed near the front end of the section and the other near the center of the section.

The zeolitic microspheres, suitably in the form of a wet cake, are charged at a controlled rate to the No. 1 slurrying tank where it is formed into a slurry by mixing it with spent ion-exchange liquid that was used in Zone 2 of the No. 2 filter, whereby partial ion-exchange of the microspheres takes place. The tank is proved with an impeller agitator operated at a speed sufficient to maintain the microspheres in suspension. The slurry is pumped from the tank into a splitter box from which it is continuously charged to the forward end (Zone 1) of the endless belt of the No. 1 filter through the weir box. The splitter box is operated to control automatically the residence of the microspheres to assure continuous uniform flow to the No. 1 filter. The control valve associated with receiver for the liquid passing through Zone 1 of the No. 1 filter is set at a level selected to drain liquid through the slurry feed at a rate such that the microspheres form a thin cake as they leave Zone 1 and pass into Zone 2. Normally a moderate vacuum level is required to produce a cake having a smooth, crack-free surface and containing liquid in the voids between the particles. Typically the cake is from ½ to 2 inches thick. Excessively high vacuum in the cake-forming zone would result in the presence of air in the cake and this would reduce the efficiency of percolation in Zone 2. Liquid draining from Zone 1 through a receiver is continuously discharged for disposal by pumping into a tank or other holding means.

Cake formed in Zone 1 of the No. 1 filter passes to Zone 2 where it is contacted at two locations with ion-exchange solution previously drained through Zone 1 of the No. 2 filter. The vacuum in the receiver associated with Zone 2 of the No. 1 filter is carefully controlled to maintain a relatively quiescent pool of ion-exchange liquid over the thin cake for a substantial length of the cake. As illustrated in the accompanying figure, the ion-exchange liquid is charged from two locations over the belt of the No. 1 filter. In some cases, for example when reaction rate is sufficiently high, liquid can be charged from a single point to the No. 1 and/or No. 2 filters. When reaction rate is relatively low, liquid can be charged from more than two locations and, if necessary, a filter with a more elongated percolation zone may be employed. Liquid percolated through the cake in Zone 2 of the No. 1 filter drains through the filter medium, into a receiver and is pumped to disposal along with liquid drained through the cake in Zone 1 of the No. 1 filter through a receiver. When the cake moves into Zone 3 of the No. 1 filter, ion-exchange liquid is drained from the cake through the receiver and it is mixed with a stock solution of fresh ion-exchange liquid charged to Zone 2 of the No. 2 filter. A strong vacuum may be applied to receiver associated with Zone 3 of the No. 1 filter since it is desirable to remove as much liquid as possible from the cake at this point and it is not necessary to avoid air spaces between particles in the cake.

The partially exchanged cake discharged from Zone 3 of the No. 1 filter is charged by gravity from the end of the belt of the filter as the belt passes over a pulley system indicated schematically. This cake is then charged to the No. 2 slurry tank. As the belt passes under the vacuum box it is washed on one or both sides by a spray of fresh water to remove entrained microspheres. The washings (WW) are collected in a receiver and pumped to a tank for mixture with fresh stock ion-exchange material.

In agitated slurry tank No. 2, the cake of partially exchanged zeolitic microspheres is mixed with the ion-exchange solution that had percolated through the percolation Zone 2 of the No. 2 filter. The slurry is circulated through this tank by a splitter box mechanism for a length of time corresponding to the residence time of the cake of the No. 1 filter to assure continuous flow. Considerable ion-exchange takes place in the No. 2 slurry tank.

Equilibrium ion-exchange solution in the slurry is removed from the microspheres in Zone 1 of the No. 2 filter through a receiver and is charged by a pump to the percolation Zone 2 of the No. 1 filter. The vacuum level in the receiver for the Zone 1 filtrate of the No. 1 filter is controlled to provide a smooth superficially dried cake with liquid in voids between the particles. As the cake leaves Zone 1 it passes into percolation Zone 2 of the No. 2 filter where, as mentioned, it is contacted at two locations with diluted fresh ion-exchange liquid. The vacuum in the receiver for liquid from Zone 2 is carefully controlled to maintain a relatively quiescent pool of ion-exchange liquid over the thin cake for a substantial length of the cake on the belt. The vacuum level should be sufficiently high to dry the cake superficially before it enters Zone 3 of the No. 2 filter where the cake is washed rapidly with water.

The water used to wash the cake in Zone 3 of the No. 2 filter is supplied by pumping water previously used to spray the underside and to lubricate the No. 2 filter. This water is collected in receiver (WW) for the No. 2 filter. The washings from the cake on the No. 2 filter are collected in another receiver (WW) and are also pumped to the make-up tank for diluting the stock ion-exchange liquid to desired concentration.

Zone 3 of the No. 2 filter is used to wash salts from the cake before the cake is discharged from the filter. In Zone 3, the cake is contacted with large volumes of liquid passing through the cake and to achieve this a high vacuum depth is set in the receiver. The vacuum depth is sufficient to provide essentially instant drainage. The cake discharged by gravity from the end of the belt of the No. 2 filter normally undergoes further processing. This may involve merely flash drying the cake or the cake may undergo additional ion-exchange and/or thermal treatment such as calcination or steaming.

It is within the scope of our invention to make modifications and changes of the system and its operation when they may be required or be desirable. For example, if the microspheres used as feed material contain appreciable fines, when the slurry from the No. 2 slurry tank is introduced into the No. 2 filter at Zone 1, fine particles may pass through the media until a cake is built up. These fines will be introduced onto cake already formed at Zone 2 of the No. 1 filter and adversely affect the porosity of the cake. In some cases this will result in difficulties in filtering ion-exchange liquid through the cake. To remedy the problem if it should occur, a clarifying procedure can be introduced in the flow from Zone 1 of the No. 2 filter to Zone 2 of the first filter. A small hydroclone or centrifuge could be employed.

As another possible variation, a No. 3 slurrying tank and a third filter may be added in series with the No. 2 filter and the flow scheme modified to introduce incoming ion-exchange liquid to the No. 3 filter and passage of the discharge from the No. 2 filter to the No. 3 slurrying tank and then to the No. 3 filter. In this case it may be desirable to further modify the operation so that only the cake on the No. 3 filter is washed. Similarly the system could be extended further to increase the number of slurrying tanks and belt filters operated in series.

In still another modification, a third agitated slurrying tank and a No. 3 may be added to produce a dual-exchanged product, such as an ammonium-rare earth exchanged product. In a further variation, product discharged from the last filter in a series may be further ion-exchanged in batch fashion, using the same or different ions employed in the series-countercurrent exchange.

It will be further understood that incoming exchange solution need not be virgin exchange solution. Thus, it is within the scope of the invention to use as incoming liquid to the Zone 2 of the No. 2 filter an ion-exchanging solution previously used to exchange the product discharged as a cake from the No. 2 filter by batch or other ion-exchange technique.

Our invention has been used successfully on a commercial scale to ion-exchange sodium in zeolitic microspheres for ammonium ions in the production of a crystalline zeolitic aluminosilicate fluid cracking catalyst. The zeolitic microspheres were produced by the procedure described in U.S. Pat. No. 3,647,718 (supra). The method included the steps of reacting spray dried kaolin clay to form microspheres, calcining the microspheres, suspending the calcined microspheres in an aqueous sodium hydroxide solution, and reacting the microspheres to form particles of synthetic crystalline faujasite (sodium exchanged form) and a silica-alumina residue of calcined clay. Mother liquor (sodium silicate solution) was removed from the crystallized microspheres and the microspheres were washed with water on a vacuum belt filter, used in conventional manner. The resulting cake of zeolitic microspheres was used as feed material for continuous countercurrent ion-exchange in accordance with this invention. The objective of the ion-exchange treatment was to ion-exchange sodium in the starting microspheres from an initial level of about 10 percent by weight to less than 1 percent by weight by exchange with ammonium ions using a minimal consumption of ammonium nitrate exchange liquid in order to avoid excessive consumption of exchange solution and the creation of large quantities of spent exchange solution that would require a costly drying operation to recover the salts contained in the solution. Further, it was desired to produce a spent exchange solution in which the mole ratio of $NaNO_3$ to $NH_4NO_3$ was 0.5/1 or below in order to avoid salting problems which would occur if spent liquor having a higher relative proportion of $Na_2O$ were to be concentrated by evaporation of water.

The No. 1 and No. 2 vacuum belt filters used in the operation had an effective belt length (length of belt over the suction box) of 12 feet and were 4 feet wide. Each filter was divided into three zones defined by rubber dams. Zone 1 (feed end) was about 3 feet long, Zone 2, the percolation zone, was about 5 feet long and Zone 3 was 3 feet long. The dam walls were about 4 inches high and were adjusted to a height of about 1 inch above the cloth. The vacuum box under the belt of each filter was divided into three sections, approximately 3 feet, 6 feet and 3 feet. These sections were coextensive with the zones established by the dams above the belt. Both units were equipped with a polypropylene filter cloth having openings smaller than the finest particles in the feed. The filters were operated with belt speeds of about 5-178 feet per minute in order to establish contact period of about one minute in the percolation zones established in the middle section of each filter. This contact period would satisfy the mass transfer constant for the ion-exchange reaction involved.

Slurry tank No. 1 had a capacity (⅔ level) of about 8800 gallons. Slurry tank No. 2 had a capacity (⅔ level) of about 490 gallons. Both tanks were equipped with impeller agitation. Residence time of slurries in both tanks were controlled by operation of splitter boxes. Calculated residence in the No. 1 tank was about 6.5 hours and about 3.7 hours for the No. 2 tank.

In operation, feed material was charged as a filter cake to the No. 1 slurry tank and they were slurried at about 40 percent solids in countercurrently flowing exchange solution. From the No. 1 slurry tank, the microspheres were moved on the No. 1 filter to the No. 2 slurry tank and then to the No. 2 filter. In charging the slurry from the No. 1 tank to the feed end of the No. 1 filter and the No. 2 tank to the feed end of the No. 2 filter the rate was controlled automatically to provide a cake of about ¾ to 1 inch thickness.

A 2N virgin ammonium solution charged to Zone 2 of the No. 2 filter was produced by diluting a 54 percent ammonium nitrate solution with wash water from the No. 1 and No. 2 filters. The volume of wash water was regulated to that required to dilute the stock solution to 2N before charging the ion-exchange solution to the system. After ammonium nitrate percolated through Zone 2 of the No. 2 filter it was circulated through the No. 2 slurry tank and then to the percolation zone of the No. 1 filter. Spent exchange solution having a desired $NaNO_3/NH_4NO_3$ ratio below 0.5 was continuously withdrawn from the first zone of the No. 1 filter. In runs carried out in accordance with this invention using 3-½ to 4 equivalents of ammonia, the $Na_2O$ was reduced to levels in the range of 0.5 to 0.6 percent by weight. When similarly prepared starting microspheres were ion-exchanged with hot 2N $NH_4NO_3$ on a single belt filter as described in U.S. Pat.No. 3,941,233 3 equivalents of ammonia was required to reduce $Na_2O$ to about 0.8 to 1 percent. About 5 to 6 equivalents of ammonia were required to reduce $Na_2O$ to about 0.5 to 0.6 percent using a two-belt filter in series with fresh 2N ammonium nitrate being charged to Zone 2 of the No. 1 and No. 2 filters and wash water being charged to Zone 3 of these filters.

The unexpectedly performance of the series countercurrent mode of exchange as compared to the series flow modification adding fresh exchange liquid to both filters is not fully understood. It is believed that the unusual efficiency is associated with the step of reslurrying the cake from the No. 1 filter in partially spent exchange solution from the No. 2 filter. It is believed that this reslurrying step affords an opportunity for equilibration of all zeolitic microspheres with exchange solution and the subsequent establishment of a new thin porous filter cake with a new texture optimum for further ion-exchange.

We claim:

1. A method for ion-exchanging zeolitic particles of a size suitable for use in fluidized bed processes with an ion-exchange solution containing cations capable of replacing cations in the zeolitic particles which comprises carrying out the ion-exchange reaction in stages by continuously passing the zeolitic particles, in series, over a continuously moving horizontal vacuum belt filter where the particles are in the form of a thin porous cake, into an agitated vessel to form a slurry and then over another continuously moving horizontal vacuum belt filter where the zeolitic particles are again in the form of a thin porous cake, while continuously contacting the zeolitic particles during such passage countercurrently with ion-exchange liquid, and washing the ion-exchanged zeolitic particles with water only after discharge from the last belt filter inthe series.

2. The method of claim 1 in which said particles are microspheres.

3. The method of claim 2 in which the thin cakes on the belt filters are ion-exchanged under percolation conditions, incoming ion-exchange liquid is fed through the cake on a second belt filter, ion-exchange liquid percolated through the cake on the second filter is used to form said fluid slurry by adding the cake of unwashed microspheres discharged from the first belt filter while agitating the slurry sufficiently to maintain the microspheres in suspension, and liquid in said slurry is drained on the second belt filter and is subsequently percolated through the cake on the first belt filter.

4. The method of claim 3 wherein the microspheres are slurried in ion-exchange liquid percolated through the cake on the first belt filter, said slurry is formed into a thin cake by draining liquid from the slurry as the slurry enters the first belt filter and liquid drained from the slurry to form said thin cake on the first belt filter is withdrawn.

5. The method of claim 4 wherein sodium ions in the zeolitic microspheres are ion-exchanged with ammonium ions.

6. The method of claim 4 wherein the underside of the continuously moving belts are sprayed with water during return passage, water used to spray the belts being the only water used except for water in the source of ion-exchange liquor charged to the second belt filter and water contained in the feed microspheres.

7. The method of claim 6 wherein incoming ammonium nitrate solution is charged to the second belt filter, said solution being produced by diluting a concentrated source of ammonium nitrate with water used to spray the belts, the water used to spray the belts being the only incoming water other than water in the concentrated source of ammonium nitrate and water contained in the feed microspheres that is added, whereby dilution of the ion-exchange liquid is minimized.

8. A system useful for ion-exchanging catalyst precursor microspheres comprising a first slurrying tank, a first horizontal vacuum belt filter with a subdivided vacuum box, a second slurrying tank and a second horizontal belt filter, means for charging microspheres serially on a continuous basis to said first tank, then to said first filter, to said second slurrying tank and to said second belt filter, means on both of said belts for forming microspheres into the thin porous cakes, means for percolating ion-exchange liquid through said cakes on said belts, means for charing an ion-exchange solution to said second belt filter, means for circulating said liquid countercurrently to the path of travel of said microspheres, means for washing ion-exchanged microspheres on the second belt with water and for draining ion-exchange liquid from ion-exchanged microspheres on the first belt without washing them and means for washing the underside of the belts with water and means for recirculating the resulting washings with incoming ion-exchange liquid.

* * * * *

UNITED STATES PATENT AND TRADEMARK OFFICE
CERTIFICATE OF CORRECTION

PATENT NO. : 4,048,284

DATED : September 13, 1977

INVENTOR(S) : Norman H. Horton et al

It is certified that error appears in the above-identified patent and that said Letters Patent are hereby corrected as shown below:

Column 3 - line 10, delete "The liquid from this slurry is agitated sufficiently to maintain the particles in suspension."

Column 4 - line 21 should read -- from the No. 1 filter is combined --; line 57 should read -- The tank is provided with an --.

Column 7 - line 50 should read -- with belt speeds of about 5-1/2 feet per minute in order --.

Column 8 - line 30 should read -- The unexpectedly efficient performance of the series counter --.

Signed and Sealed this

Twentieth Day of December 1977

[SEAL]

Attest:

RUTH C. MASON
Attesting Officer

LUTRELLE F. PARKER
Acting Commissioner of Patents and Trademarks